(12) United States Patent
Okuma et al.

(10) Patent No.: US 11,059,404 B2
(45) Date of Patent: Jul. 13, 2021

(54) REINFORCEMENT STRUCTURE FOR SEAT BACK FRAME

(71) Applicants: TS TECH CO., LTD., Asaka (JP); HONDA MOTOR CO., LTD., Tokyo (JP)

(72) Inventors: Kei Okuma, Shioya-gun (JP); Naoya Nishimoto, Shioya-gun (JP); Yuta Sugaya, Shioya-gun (JP); Hisato Oku, Wako (JP); Shingo Baba, Wako (JP)

(73) Assignees: TS TECH CO., LTD., Asaka (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/496,483

(22) PCT Filed: Mar. 20, 2018

(86) PCT No.: PCT/JP2018/011040
§ 371 (c)(1),
(2) Date: Sep. 23, 2019

(87) PCT Pub. No.: WO2018/174060
PCT Pub. Date: Sep. 27, 2018

(65) Prior Publication Data
US 2020/0307429 A1    Oct. 1, 2020

(30) Foreign Application Priority Data

Mar. 23, 2017 (JP) .............................. JP2017-056952

(51) Int. Cl.
*B60N 2/68* (2006.01)
*B60N 2/64* (2006.01)
*B60N 2/36* (2006.01)

(52) U.S. Cl.
CPC ............... *B60N 2/686* (2013.01); *B60N 2/64* (2013.01); *B60N 2/36* (2013.01); *B60N 2/68* (2013.01); *B60N 2/682* (2013.01)

(58) Field of Classification Search
CPC . B60N 2/686; B60N 2/64; B60N 2/68; B60N 2/682; B60N 2/36
See application file for complete search history.

(56) References Cited

U.S. PATENT DOCUMENTS 7,731,293 B1 * 6/2010 Donovan ............... B60N 2/686
                                                     297/452.18
8,827,371 B2 * 9/2014 Brncick .................. A61H 9/00
                                                     297/452.41

(Continued)

FOREIGN PATENT DOCUMENTS

JP    S59-83129 U    6/1984
JP    2001-61593 A   3/2001

(Continued)

OTHER PUBLICATIONS

May 15, 2018 Search Report issued in International Patent Application No. PCT/JP2018/011040.

(Continued)

*Primary Examiner* — Syed A Islam
(74) *Attorney, Agent, or Firm* — Oliff PLC

(57) ABSTRACT

A reinforcement structure for a seat back frame includes a panel material; and a frame material joined to the panel material. The frame material is formed as a hat-type frame material including a web portion which is formed as a substantial U shape from a cross-sectional view and which forms a closed cross-sectional shape with the panel material, and a flange which is formed as one with the web portion and (Continued)

which is also joined to the panel material. A bead is formed in the panel material in a position opposing to the frame material.

15 Claims, 8 Drawing Sheets

(56) References Cited

U.S. PATENT DOCUMENTS

| | | | | |
|---|---|---|---|---|
| 8,985,696 B2* | 3/2015 | Yasuda | ................ | B60N 2/686 |
| | | | | 297/452.18 |
| 9,254,769 B2* | 2/2016 | Gross | .................... | B21D 53/88 |
| 9,643,524 B2* | 5/2017 | Behrens | ............... | B60N 2/686 |
| 9,724,858 B2* | 8/2017 | Ribaric | .............. | B29C 45/0003 |
| 9,783,091 B2* | 10/2017 | Yasuda | .................. | B60N 2/64 |
| 9,840,174 B2* | 12/2017 | Tosco | .................... | B60N 2/682 |
| 10,160,359 B2* | 12/2018 | Tomita | ................... | B60N 2/36 |
| 10,562,428 B2* | 2/2020 | Jacob | ....................... | B60N 2/20 |
| 10,576,858 B2* | 3/2020 | Okuma | .................. | B60N 2/90 |
| 2007/0046069 A1 | 3/2007 | Kim et al. | | |
| 2008/0258520 A1 | 10/2008 | Uchida | | |
| 2010/0283309 A1* | 11/2010 | Funk | ....................... | B29C 44/18 |
| | | | | 297/452.48 |
| 2015/0232010 A1 | 8/2015 | Sato et al. | | |
| 2015/0307005 A1* | 10/2015 | Dill | ........................ | B60N 2/686 |
| | | | | 297/354.1 |
| 2016/0368406 A1* | 12/2016 | Pluta | ........................ | B60N 2/64 |

FOREIGN PATENT DOCUMENTS

| | | |
|---|---|---|
| JP | 4859195 B2 | 1/2012 |
| JP | 2013-123933 A | 6/2013 |
| JP | 2013-212766 A | 10/2013 |
| JP | 2014-19408 A | 2/2014 |

OTHER PUBLICATIONS

Sep. 24, 2019 International Preliminary Report on Patentability issued in International Patent Application No. PCT/JP2018/011040.

* cited by examiner

REINFORCEMENT STRUCTURE FOR SEAT BACK FRAME

TECHNICAL FIELD

The present invention relates to a reinforcement structure for a seat back frame in a seat for a vehicle.

BACKGROUND ART

Conventionally, there is a seat back frame used in a seat for a vehicle. Such seat back frame includes a panel material including a metallic plate in a substantial rectangle and a frame material formed as a frame to be joined with a panel frame (for example, see patent document 1).

In the region of the panel material where the frame material is not provided, a plurality of beads are formed by projecting the metallic plate in a convex shape and the structure is reinforced by the beads.

CITATION LIST

Patent Literature

Patent Document 1: JP 4859195 B2

SUMMARY OF INVENTION

Technical Problem

The frame material in a conventional seat back frame is formed in a circular tube shape, and the square area in contact with the panel material is small. In the conventional seat back frame, the frame material in a circular tube shape is simply joined to the panel material, and the stiffness of the entire seat back frame may not be sufficient.

If the stiffness of the seat back frame is not sufficient, it may be difficult to suppress noise due to insufficient stiffness and noise due to vibration when the vehicle is running.

The technical problem to be solved by the present invention is to enhance stiffness in a seat back frame and to suppress noise.

Solution to Problem

In order to solve the above problems, according to aspect 1 of the present invention, a reinforcement structure for a seat back frame includes: a panel material; and a frame material joined to the panel material, wherein, the frame material is formed as a hat-type frame material including a web portion which is formed as a substantial U shape from a cross-sectional view and which forms a closed cross-sectional shape with the panel material, and a flange which is formed as one with the web portion and which is also joined to the panel material, and a bead is formed in the panel material in a position opposing to the frame material.

According to aspect 2 of the present invention, in the reinforcement structure for the seat back frame according to aspect 1, the bead projects toward the web portion side of the frame material.

According to aspect 3 of the present invention, in the reinforcement structure for the seat back frame according to aspect 1, the bead is formed along the length direction of the frame material.

According to aspect 4 of the present invention, in the reinforcement structure for the seat back frame according to aspect 1, the panel material includes a non-joining portion which is formed to be concave with relation to the frame material and which is where the panel material is not joined to the flange of the frame material; and the bead is formed to pass the non-joining portion.

According to aspect 5 of the present invention, in the reinforcement structure for the seat back frame according to aspect 1, the panel material is formed in a rectangular shape from a front view, the frame material is joined along four sides of the panel material, and the bead is formed along the four sides of the panel material.

According to aspect 6 of the present invention, in the reinforcement structure for the seat back frame according to aspect 5, the seat back frame includes a plurality of columns in the seat back, the frame material is joined to a position of the panel material corresponding to a position between the columns in the seat back, and the bead is formed in the position of the panel material corresponding to the position between the columns in the seat back.

According to aspect 7 of the present invention, in the reinforcement structure for the seat back frame according to aspect 1, another bead in a shape different from the bead is formed in the panel material near the bead.

According to aspect 8 of the present invention, in the reinforcement structure for the seat back frame according to aspect 6, another bead in a shape different from the bead is formed in the panel material near the bead, and the another bead is formed near the bead formed in the position of the panel material corresponding to the position between the columns in the seat back.

According to aspect 9 of the present invention, in the reinforcement structure for the seat back frame according to aspect 1, the panel material includes a plurality of holes formed in a position corresponding to the frame material, and the bead is formed throughout a space between adjacent holes among the plurality of holes.

According to aspect 10 of the present invention, in the reinforcement structure for the seat back frame according to aspect 9, the plurality of holes include a hole formed in a portion where extending lines of beads positioned in an orthogonal direction among the beads intersect.

Advantageous Effects of Invention

According to aspect 1 of the present invention, the panel material can be reinforced by the frame material and the panel material can be reinforced by the bead. Therefore, the stiffness of the seat back frame is synergistically enhanced by both the frame material and the bead. Since the stiffness of the seat back frame can be enhanced, the noise generated due to insufficient stiffness and the noise generated by the vibration of the vehicle running can be suppressed.

The frame material is formed with a hat-type frame material including a flange. Therefore, the frame material can be easily joined to the panel material and the accuracy of joining can be enhanced. Therefore, the reliability when the frame material is joined to the panel material is enhanced.

According to aspect 2 of the present invention, the bead is projected toward the web portion side of the frame material. Therefore, the frame material enables the joined portion to be smaller while enhancing the stiffness.

According to aspect 3 of the present invention, the bead is formed along the length direction of the frame material. Therefore, the stiffness of the seat back frame can be enhanced in a wired range along the length direction of the frame material. With this, the noise generated due to insufficient stiffness and the noise generated due to the vibration when the vehicle is running can be suppressed even more.

According to aspect 4 of the present invention, the non-joining portion is formed in the panel material to be concave with relation to the frame material. Therefore, the noise generated by contact between the panel material and the frame material can be suppressed.

The bead is formed to pass the non-joining portion, and therefore the stiffness in the non-joining portion is enhanced.

According to aspect 5 of the present invention, the frame material is joined along the four sides of the panel material. The beads are formed along the four sides of the panel material. Therefore, the stiffness of the outer circumference edge of the panel material is enhanced even more.

According to aspect 6 of the present invention, the frame material is joined in the position of the panel material corresponding to the position between the columns in the seat back. The beads are formed in a portion of the panel material corresponding to the position between the columns in the seat back. Therefore, the stiffness of the center of the panel material can be enhanced even more.

According to aspect 7 of the present invention, another bead with a shape different from the beads is formed near the beads in the panel material. Therefore, the bead and the another bead can synergistically enhance the stiffness of the panel material.

According to aspect 8 of the present invention, the another bead is formed near the bead formed in the position of the panel material corresponding to the position between the columns in the seat back. Therefore, the bead and the another bead synergistically enhance the stiffness of the center of the panel material even more.

According to aspect 9 of the present invention, the bead is formed throughout the space between the adjacent holes among the plurality of holes formed in the position corresponding to the frame material. Therefore, even if a plurality of holes are formed, the stiffness necessary in the panel material can be achieved.

According to aspect 10 of the present invention, the plurality of holes include a hole formed in a portion where the extending lines of the beads positioned in an orthogonal direction among the beads intersect with each other. Therefore, the stiffness in the portion where the hole is formed in the panel material can be enhanced.

DESCRIPTION OF EMBODIMENTS

The present embodiment is described below with reference to the drawings. The embodiments below include various limitations technically preferable to implement the embodiment, however, the technical scope of the present invention is not limited by the embodiments described below and the illustrated examples.

Figure 1:
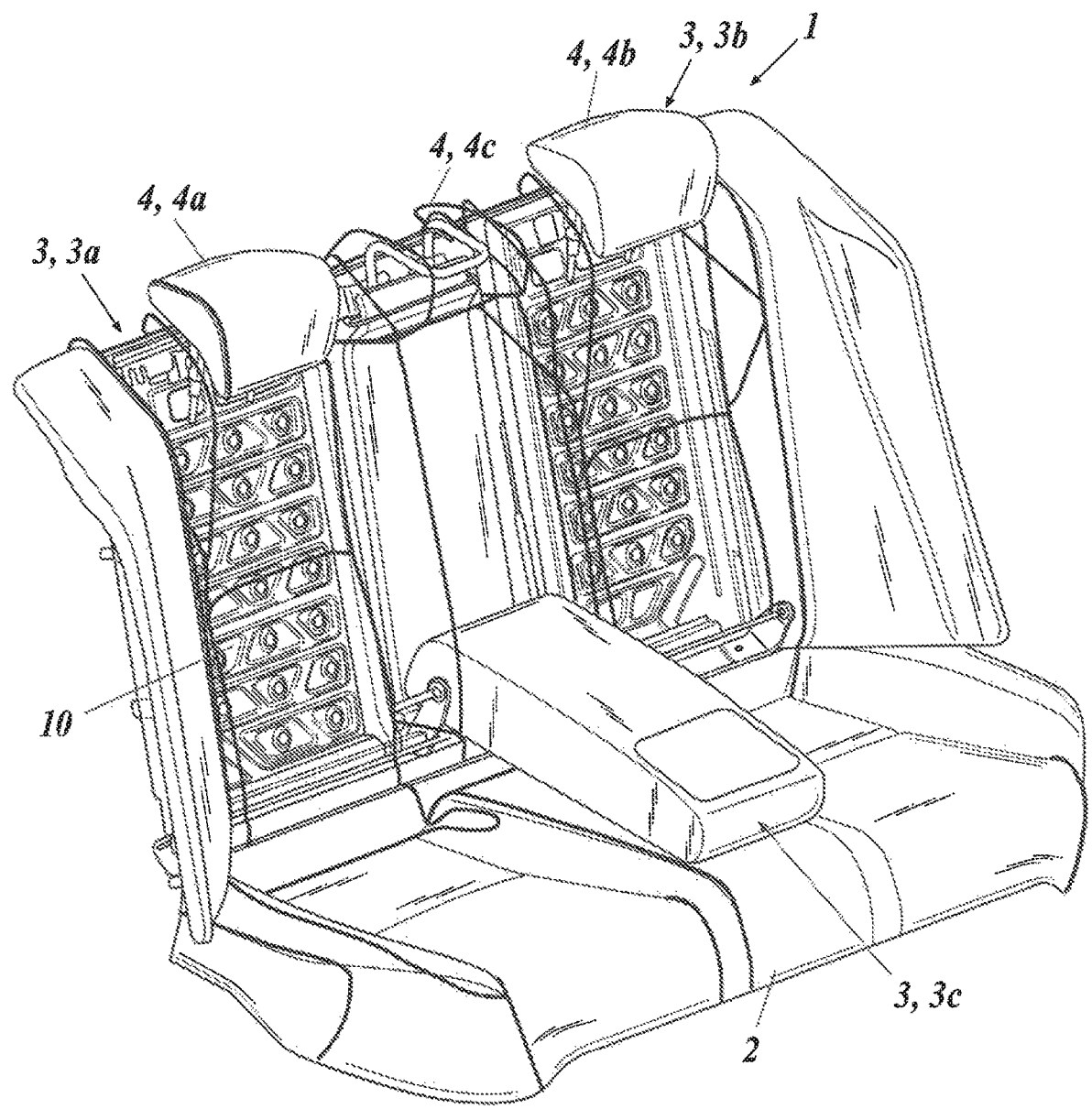
FIG. 1 is a perspective view showing a seat for a vehicle provided with a seat back frame.
Figure 1:
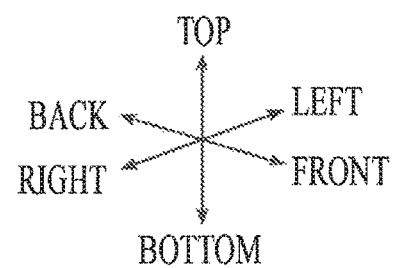

The reference numeral 1 shown in FIG. 1 shows a vehicle seat provided inside an automobile (vehicle) and the vehicle seat 1 according to the present embodiment is a rear sheet for three people. FIG. 1 displays a silhouette showing a portion of a cushion portion of a seat back 3 and a cushion portion of a head rest 4 (4c) provided in a center seat.

According to the present embodiment, various descriptions are provided based on the direction that the vehicle seat 1 is provided in the vehicle.

The vehicle seat 1 includes a seat cushion 2 which receives a buttock of each passenger when three people are seated, and a seat back 3 which is to be a back rest for each passenger provided in a state standing in a rear edge of the seat cushion 2.

A seating region for three people is formed in the seat cushion 2 and the seat back 3 by making a cushion material provided on the inner side of the outer material uneven and corresponding seams of the outer material to boundaries of the unevenness.

The seating region of the seat back 3 is divided to a right side seat back 3a, a left side seat back 3b, and a center seat back 3c. A head rest 4 (4a, 4b, and 4c) which receives a head of each passenger is provided in an upper portion in each seat back 3a, 3b, and 3c.

The center seat back 3c can be tilted forward with a rotating axis provided in a lower edge as a center. With this, a center seat back 3c functions as an arm rest which can be used from the left side seat back 3a and the right side seat back 3b when laid forward as shown in FIG. 1.

The seat back 3 includes a seat back frame 10 as frame work. The seat back frame 10 includes a panel material 20 and a frame material 30 joined to the panel material 20.

Described in detail, the seat back 3 includes a seat back frame 10 provided with a cushion material and covered by an outer material. The seat back frame 10 is for three columns in the seat back.

Figure 2:
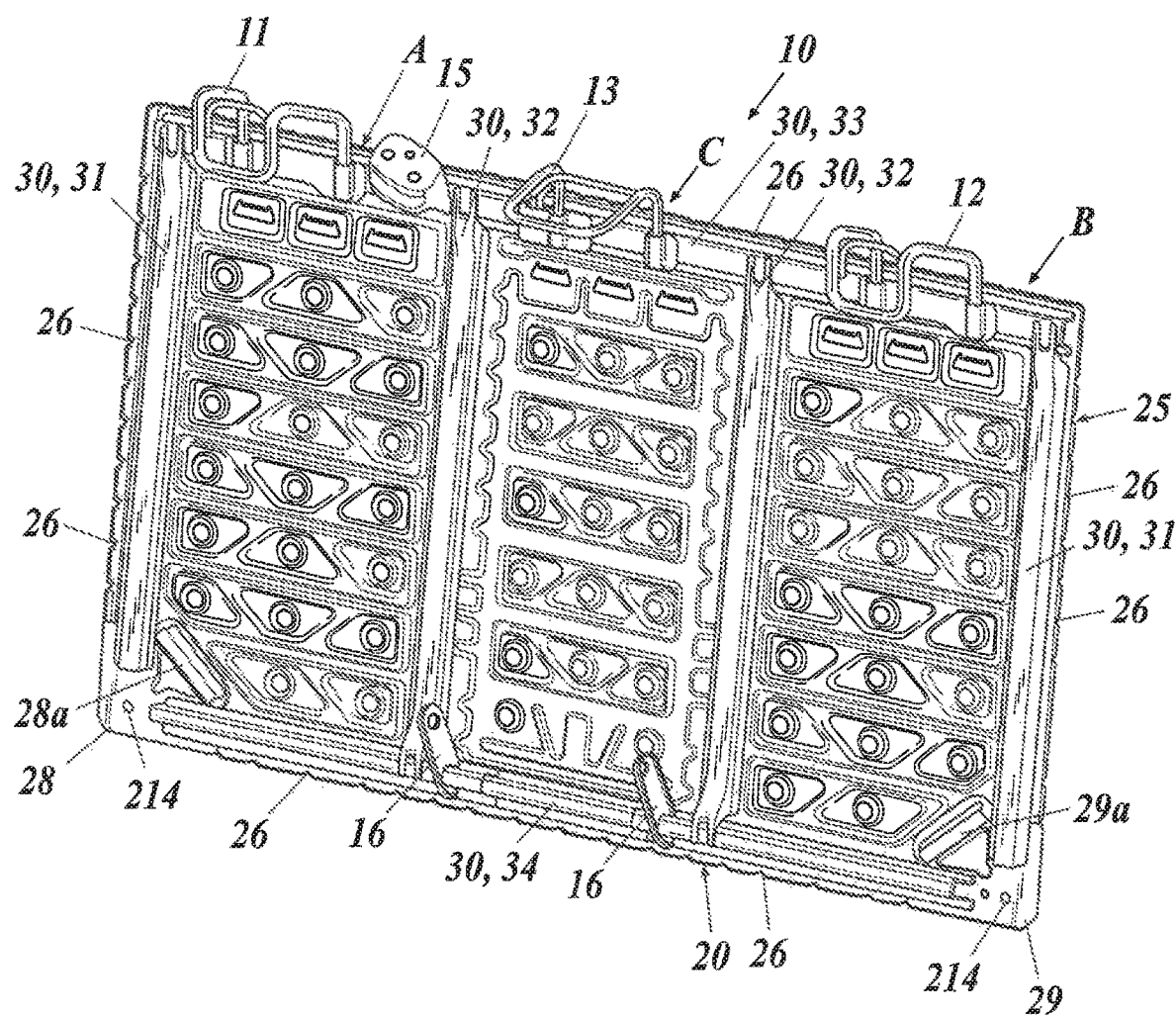
FIG. 2 is a front perspective view showing a seat back frame.
Figure 3:
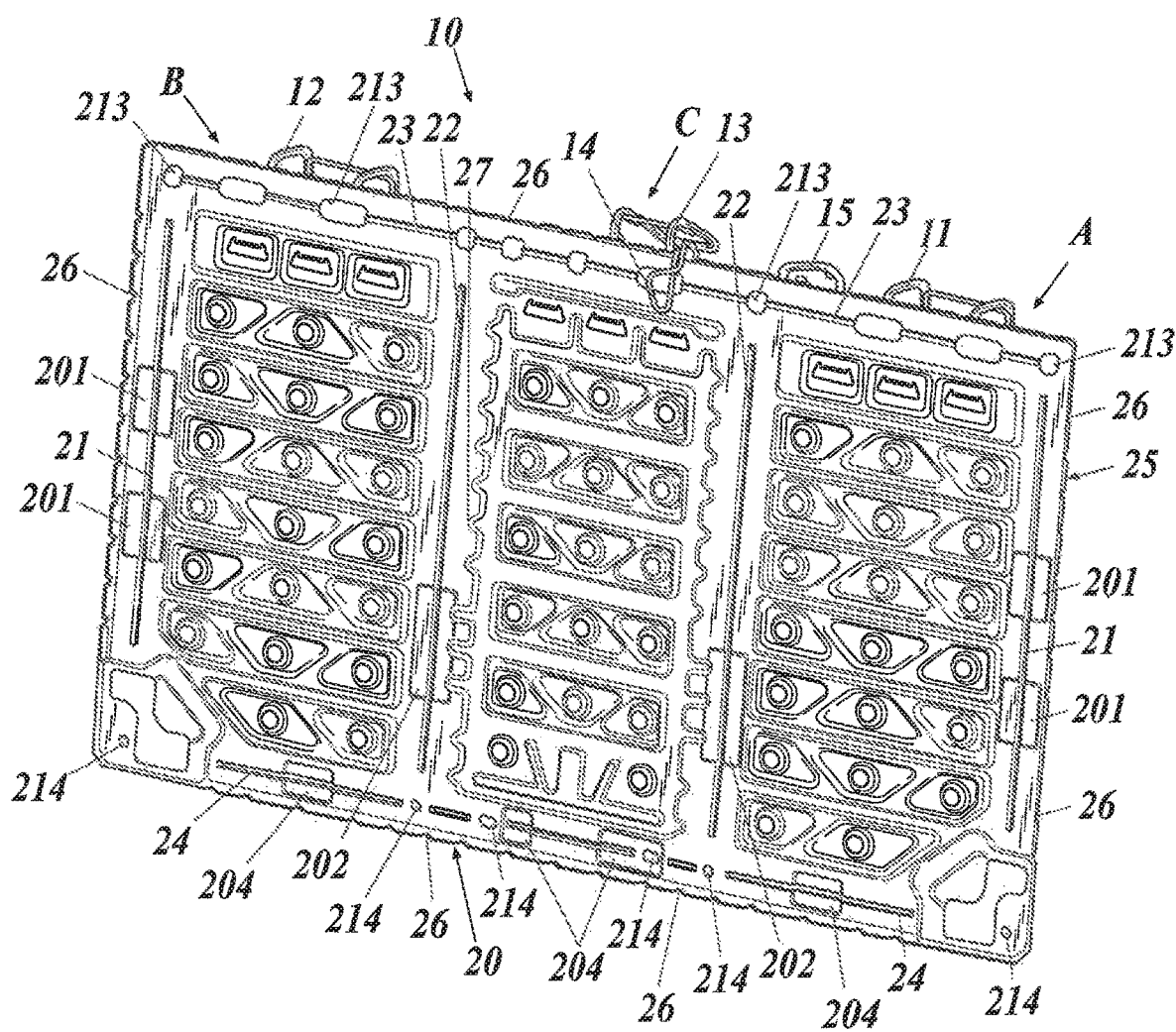
FIG. 3 is a rear perspective view showing a seat back frame.
Figure 4:
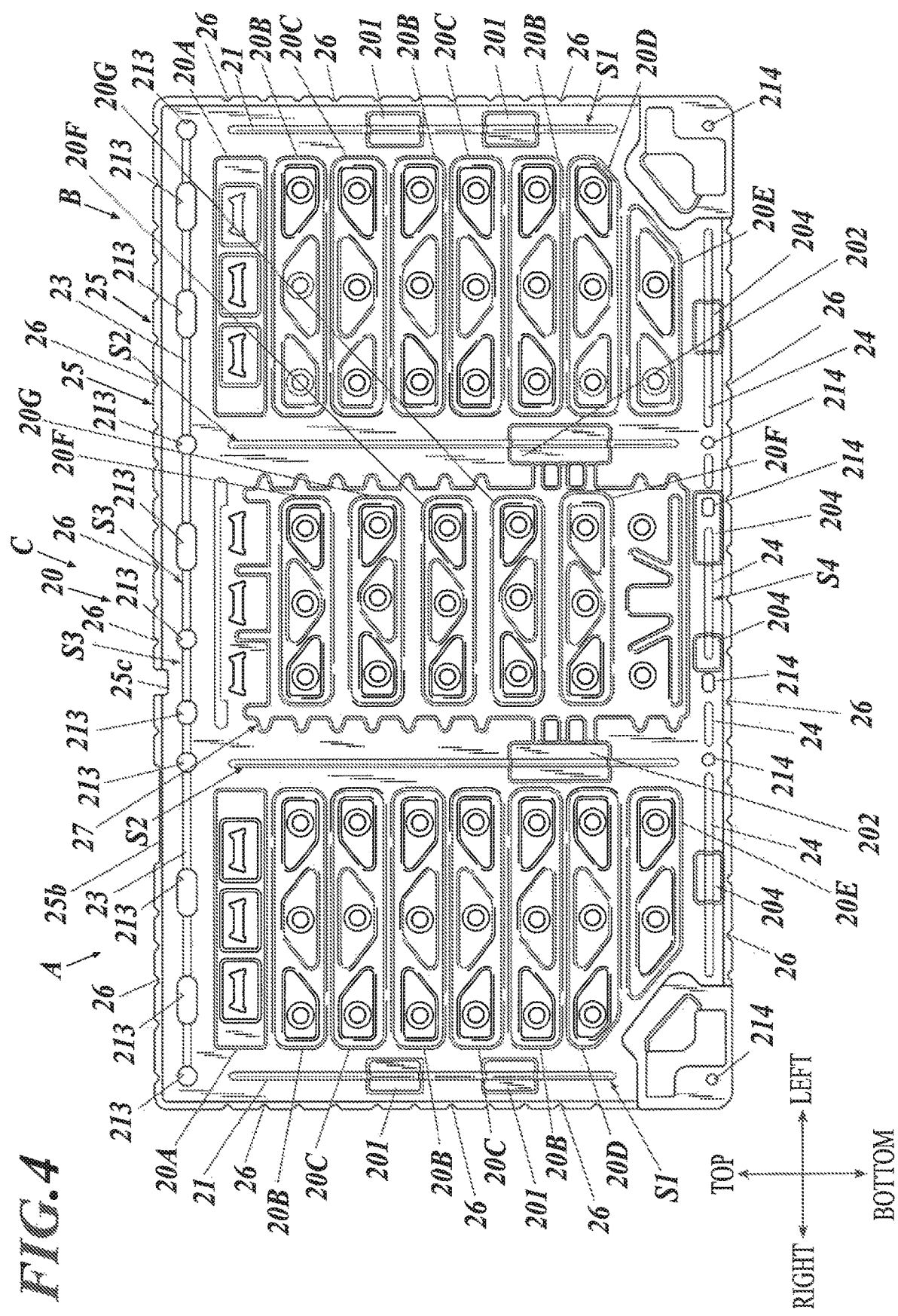
FIG. 4 is a front view showing a front surface of a panel material.

The panel material 20 (also called a pan frame) is a metallic plate including a steel or an aluminum alloy and are formed in a rectangular shape from a front view as shown in FIG. 2 to FIG. 4. Such panel material 20 is mounted on the vehicle seat with a direction along a long side provided along a horizontal direction and a direction along a short side provided along a vertical direction.

The frame material 30 includes side frame materials 31 and 31 attached along the vertical direction of both left and right edges of a front surface of the panel material 20, middle frame materials 32 and 32 attached along a vertical direction in two positions of the center of the front surface of the panel material 20, an upper frame material 33 provided along a horizontal direction in an upper edge on the front surface side of the panel material 20, and a lower frame material 34 provided along a horizontal direction in a lower edge on the front surface side of the panel material 20.

Such frame materials 31 to 34 are metallic supporting rods such as a steel or an aluminum alloy.

The upper edges of the side frame materials 31 and 31 and the middle frame materials 32 and 32 are joined to the upper frame material 33 by laser welding, and the lower edges of the middle frame materials 32 and 32 are joined to the lower frame material 34 by laser welding.

The upper edges of the side frame materials 31 and 31 and the middle frame materials 32 and 32 and the lower edges of the middle frame materials 32 and 32 are welded overlapped on the upper frame materials 33 and lower frame materials 34. Therefore, the edges are set to a thin thickness.

The reinforcement panels 28 and 29 to reinforce the corner of the panel material 20 are joined with the lower edges of both the left and right side of the panel material 20. The lower edges of the side frame materials 31 and 31 are joined by laser welding to the reinforcement panels 28 and 29 without reaching the lower frame material 34. Both edges of the lower frame material 34 are joined to the reinforcement panels 28 and 29 by laser welding.

There is a joining space in the lower edge of both the left and right side of the panel material 20 to join the reinforcement panels 28 and 29, and the joining space is formed in a shape similar to the reinforcement panels 28 and 29.

The laser welding according to the present embodiment is performed from the rear side of the panel material 20. The laser welding is performed from the rear side of the panel material 20 when necessary parts such as ahead rest frame, etc. as described later is joined to the upper frame material 33 and the lower frame material 34.

The reinforcement panels 28 and 29 are panel materials extending from the corner in the lower edge of both the left and right of the panel material 20 to the inner side of the side frame materials 31 and 31 and the lower frame materials 34, and the reinforcement panels 28 and 29 are set to a thickness thicker than the panel material 20. Reinforcement brackets 28a and 29a projecting to the front are joined positioned diagonal along the shape of the outer side edge in later-described reinforcement structure sections 20D and 20E in the extending portion of the reinforcement panels 28 and 29 extending to the inner side of the side frame materials 31 and 31 and the lower frame material 24.

Holes corresponding to holes 214 are formed in the reinforcement panels 28 and 29, and a projection nut (not shown) to attach the seat back frame 10 to the vehicle side is joined by projection joining to the position of the hole.

As necessary components, a head rest frame 11, a head rest frame 12, a head rest frame 13, a striker 14, and a seat belt attaching unit 15, are joined to the upper frame material 33 by laser welding.

The head rest frame 11 is included in the framework of the right side head rest 4a corresponding to the right side seat back 3a. The right side head rest 4a is formed by providing a cushion material to the head rest frame 11 and covering the above with the outer material.

The head rest frame 12 is included in the framework of the left side head rest 4b corresponding to the left side seat back 3b. The left side head rest 4b is formed by providing a cushion material to the head rest frame 12 and covering the above with the outer material.

The head rest frame 13 is included in the framework of the center head rest 4c corresponding to the center seat back 3c. The center head rest 4c is formed by providing a cushion material to the head rest frame 13 and covering the above with the outer material.

The striker 14 is held by a lock mechanism (not shown) provided in the vehicle main body of the automobile, and with this, the posture of the seat back 3 is maintained. Such striker 14 is formed to extend from the upper frame material 33 to the position where the lock mechanism is. According to the present embodiment, the striker 14 extends to the rear from the upper frame material 33 passing above the seat back frame 10.

The seat belt attaching unit 15 is used to attach the seat belt for the passenger seated in the center of the vehicle seat 1. The seat belt attaching unit 15 is formed to project upward and forward from the upper frame material 33.

A head rest pillar which is a lower edge of the head rest frames 11, 12, and 13 is fixed to the upper frame material 33. Alternatively, for example, the height may be adjusted along the head rest pillar. In this case, although not shown, a supporting portion which supports a holding portion which holds the head rest frame so as to be able to adjust the height is welded to the upper frame material 33.

As necessary components, a pair of arm rest brackets 16 and 16 are joined to the lower frame material 34 by laser welding. As described above, the center seat back 3c functions as an arm rest which can be tilted forward with the rotating axis as the center provided in the lower edge to be used from the left side seat back 3a and right side seat back 3b. The pair of arm rest brackets 16 and 16 support the center seat back 3c (arm rest) to be rotatable.

There are spaces S1 to S4 to join the frame materials 31 to 34 by laser welding in the area of the panel material 20 surrounding later-described reinforcement structure sections 20A to 20G. That is, there are spaces S1 and S1, each set along the vertical direction, to join the side frame materials 31 and 31 in the left and right edges of the front surface of the panel material 20, and there are spaces S2 and S2, each set along the vertical direction, to join the middle frame materials 32 and 32 in two portions of the center of the front surface of the panel material 20. There is a space S3 along the horizontal direction to join the upper frame material 33 in the upper edge on the front surface side of the panel material 20. There is a space S4 along the horizontal direction to join the lower frame material 34 in the lower edge on the front surface side of the panel material 20.

All of the frame materials 31 to 34 are formed as a hat-type frame material including a web portion W with a cross section in a substantial concave shape (or a cross section in a substantial gate shape, a cross section in a substantial U shape open toward the left, or a cross section in a substantial U shape) to form a closed cross section between the panel material 20 and a flange F which is joined to the panel materials 20 and which is formed as one with the web portion W.

The flange F in the frame materials 31 to 34 are joined to the spaces S1 to S4 of the panel material 20 by laser welding.

The panel material 20 is divided into three regions by the left and right side frame materials 31 and 31 and the left and right middle frame materials 32 and 32.

That is, the panel material 20 is divided into the following three regions, a right region A between the right side frame material 31 and the right middle frame material 32, a left region B between the left side frame material 31 and the left middle frame material 32, and a center region C between the right middle frame material 32 and the left middle frame material 32.

The regions A, B, and C in the panel material 20 corresponds to the seating regions of the seat back 3 itself (right side seat back 3a, left side seat back 3b, and center seat back 3c).

The right region A of the panel material 20 includes reinforcement structure sections 20A, 20B, 20C, 20D, and 20E formed to be aligned vertically. That is, the sections 20A, 20B, 20C, 20B, 20C, 20B, 20D, and 20E are formed aligned in order from the top.

The reinforcement structure sections 20A to 20E refer to the portions where the panel material 20 is formed with unevenness in the front and rear direction attached, and a plurality of unevenly shaped portions are formed in each section. Each section is formed with a plurality of unevenly shaped portions and with this, beads corresponding to the front view shape of the plurality of unevenly shaped portions are formed. Therefore, the stiffness can be enhanced.

The bead is a configuration of a projecting shape (rail shape) formed to project forward from the front surface of the panel material 20. The metallic plate included in the panel material 20 may be easily deformed by curving and bending if in a flat state. By forming the beads in a projecting shape by a plastic process, the stiffness can be enhanced so that the deforming of the panel material 20 hardly occurs.

As shown in FIG. 2 to FIG. 4, the reinforcement structure section 20A is a rectangle long from left to right and includes three unevenly shaped portions which are formed in a rectangle shape in a front view.

The reinforcement structure section 20B is a rectangle long from left to right and includes two unevenly shaped portions formed in a right-angled trapezoid from a front view (that is, a trapezoid including two right-angled portions) and an unevenly shaped portion formed in an isosceles trapezoid from a front view.

The reinforcement structure section 20C is a rectangle long from left to right and includes unevenly shaped portions formed to be vertically symmetric with the unevenly shaped portions formed in the reinforcement structure section 20B. That is, the reinforcement structure section 20C includes two unevenly shaped portions formed in a right-angled trapezoid from a front view and an unevenly shaped portion formed in an isosceles trapezoid from a front view.

The reinforcement structure section 20D is a pentagon (pentagon with three right angles) long from left to right and includes an unevenly shaped portion formed in a right angled trapezoid from a front view, an unevenly shaped portion formed in a parallelogram from a front view, and an unevenly shaped portion formed in an isosceles trapezoid from a front view.

The reinforcement structure section 20E is a right-angled trapezoid long from left to right and includes one unevenly shaped portion formed in a right-angled trapezoid from a front view, and an unevenly shaped portion formed in a parallelogram from a front view.

A penetrating hole is formed in the center of each unevenly shaped portion, and the panel material 20 becomes lighter. The penetrating hole can be used for the purpose of passing lines such as electric lines, or other purposes.

As shown in FIG. 2 to FIG. 4, the left region B of the panel material 20 includes the reinforcement structure sections 20A, 20B, 20C, 20D, and 20E formed to be aligned vertically. That is, the sections 20A, 20B, 20C, 20B, 20C, 20B, 20D, and 20E are formed aligned in order from the top.

The sections 20A to 20C are the same as the above-described reinforcement structure sections 20A to 20C formed in the right region A.

The section 20D is a state inverting the left and the right (symmetrical with the axis line along the vertical direction) of the above-described reinforcement structure section 20D formed in the right region A.

The section 20E is a state inverting the left and the right (symmetrical with the axis line along the vertical direction) of the above-described reinforcement structure section 20E formed in the right region A.

As shown in FIG. 2 to FIG. 4, the central region C of the panel material 20 includes reinforcement structure sections 20F and 20G formed to be aligned vertically.

The reinforcement structure section 20F is a rectangle long from left to right and includes two unevenly shaped portions formed in a right-angled trapezoid (that is, a trapezoid including two right angles) from a front view and an unevenly shaped portion formed in an isosceles trapezoid from a front view.

The reinforcement structure section 20G is a rectangle long from left to right and includes an unevenly shaped portion formed vertically symmetrical to the unevenly shaped portion formed in the reinforcement structure section 20F. That is, the reinforcement structure section 20G includes two unevenly shaped portions formed in a right-angled trapezoid from a front view and an unevenly shaped portion formed in an isosceles trapezoid from a front view.

As shown in FIG. 2 to FIG. 7, the panel material 20 includes an outer circumference flange 25 formed by bending the outer circumference edge of the panel material 20 forward. That is, the panel material 20 is formed in a tray shape by bending the outer circumference edge.

Figure 5:
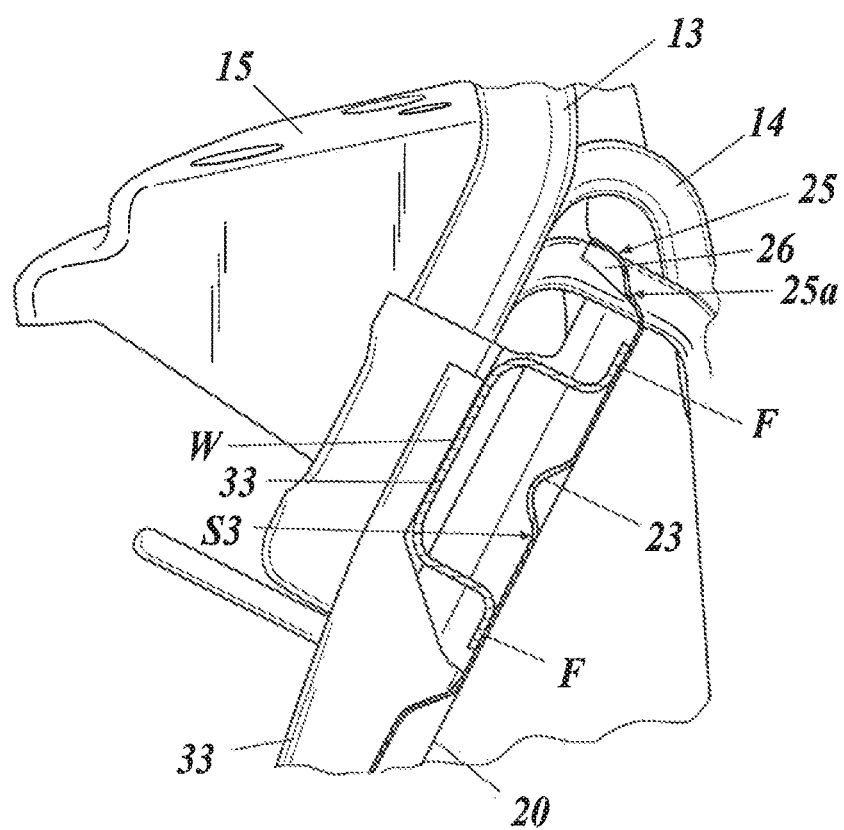
FIG. 5 is an enlarged cross-sectional view showing a portion near an upper edge of the seat back frame.

As shown in FIG. 5, the outer circumference flange 25 is formed with the outer circumference edge of the panel material 20 bent in a stair shape. That is, the outer circumference flange 25 is not formed by simply curving when the panel material 20 is formed by the plastic process. The outer circumference flange includes a step 25a.

The outer circumference flange 25 is formed to be continuous in at least the corner of the panel material 20. That is, the outer circumference flange 25 is formed along the outer circumference edge of the panel material 20. For example, even if there are portions where the outer circumference flange 25 is not formed in the middle of the outer circumference edge, the outer circumference flange 25 continues in at least the corner of the panel material 20.

As shown in FIG. 2 to FIG. 4, a plurality of outer circumference beads 26 . . . are formed in the outer circumference flange 25 positioned with intervals in between in the circumference direction of the panel material 20. Such plurality of outer circumference beads 26 . . . are positioned near the beads 21 to 24 (later described) formed facing the frame materials 31 to 34, and the plurality of outer circumference beads 26 . . . are shaped differently from the beads 21 to 24.

The plurality of outer circumference beads 26 are positioned with a substantially equal interval with relation to the outer circumference flange 25 when the panel material 20 is viewed in each side.

However, as described above, the striker 14 and the seatbelt attaching unit 15 which are attached to the upper frame material 33 are projected upward or forward and this may interfere with the outer circumference flange 25 and cause damage. Therefore, in the position where the striker 14 and the seatbelt attaching unit 15 are provided, the outer circumference flange 25 itself is formed partly missing in the upper edge of the panel material 20. The portion where the outer circumference flange 25 is partly missing is to be non-continuous portions 25b and 25c. The striker 14 and the seatbelt attaching portions 15 are provided in the non-continuous portions 25b and 25c.

The plurality of outer circumference beads 26 . . . are formed in the outer circumference flange 25 along a front and rear direction. That is, the plurality of outer circumference beads 26 . . . are formed along the folding direction of the outer circumference flange 25 formed folded forward.

Figure 6:
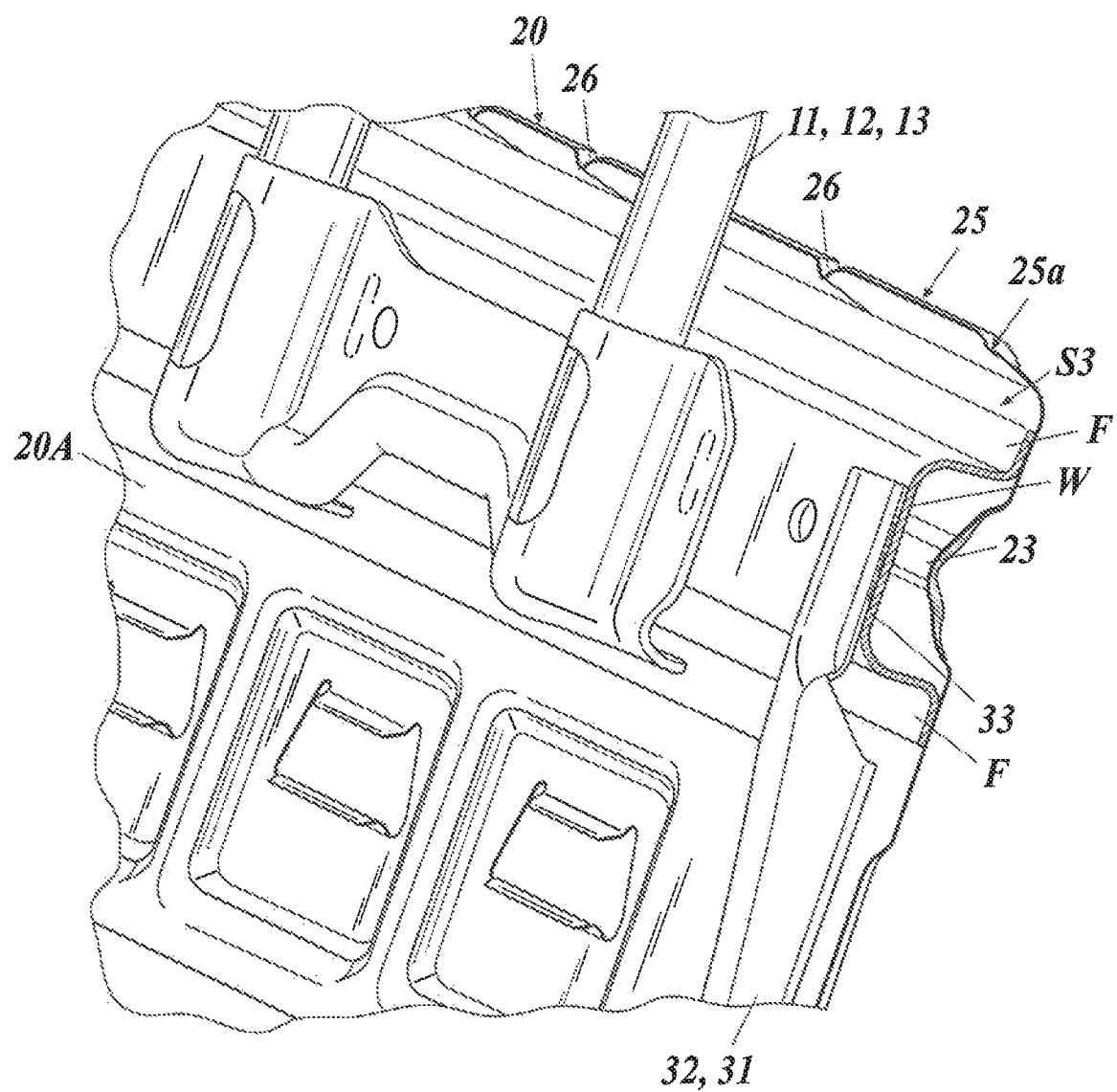
FIG. 6 is an enlarged perspective view showing a portion near an upper edge of the seat back frame.
Figure 7:
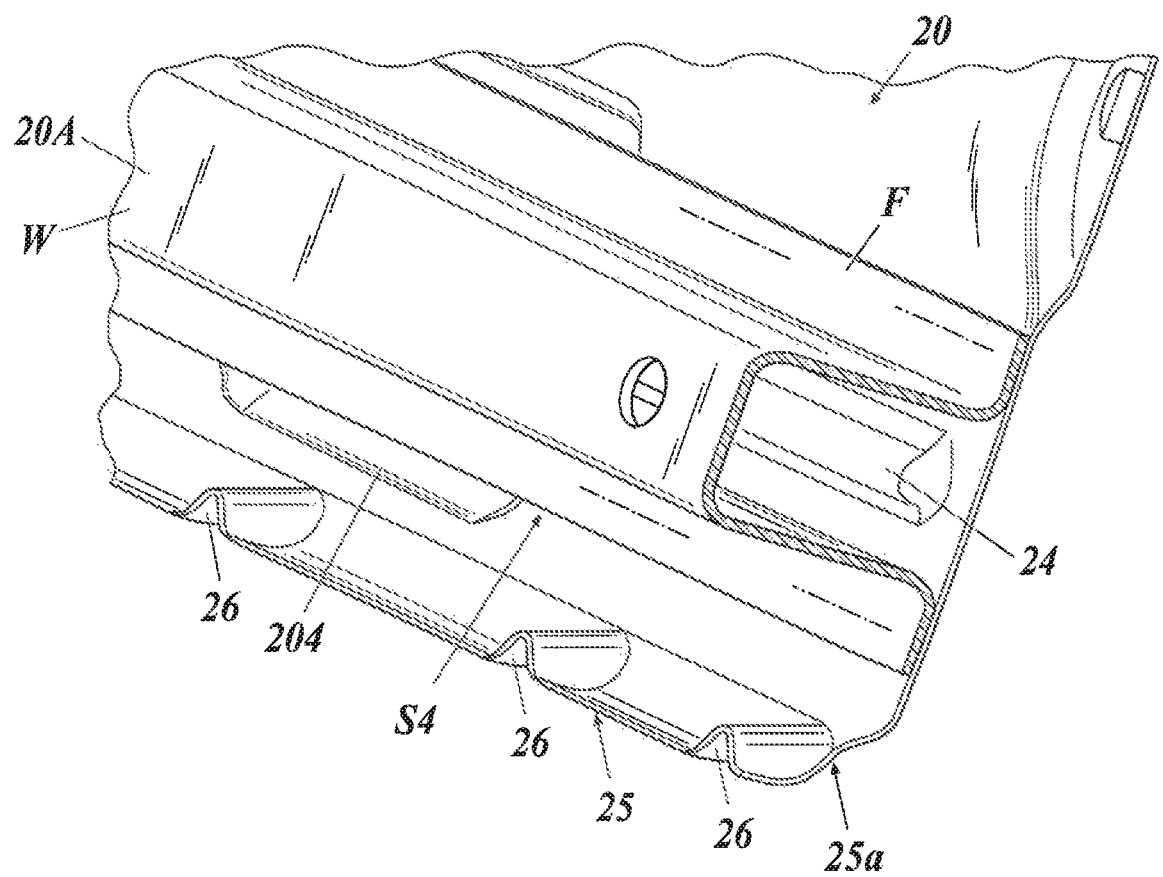
FIG. 7 is an enlarged perspective view showing a portion near a lower edge of the seat back frame.
Figure 8:
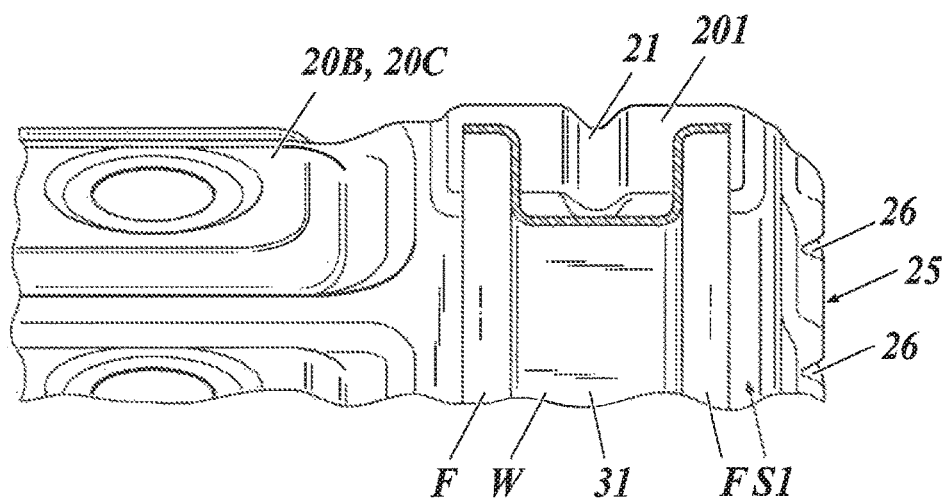
FIG. 8 is an enlarged perspective view showing a portion near a side edge of the seat back frame.
Figure 9:
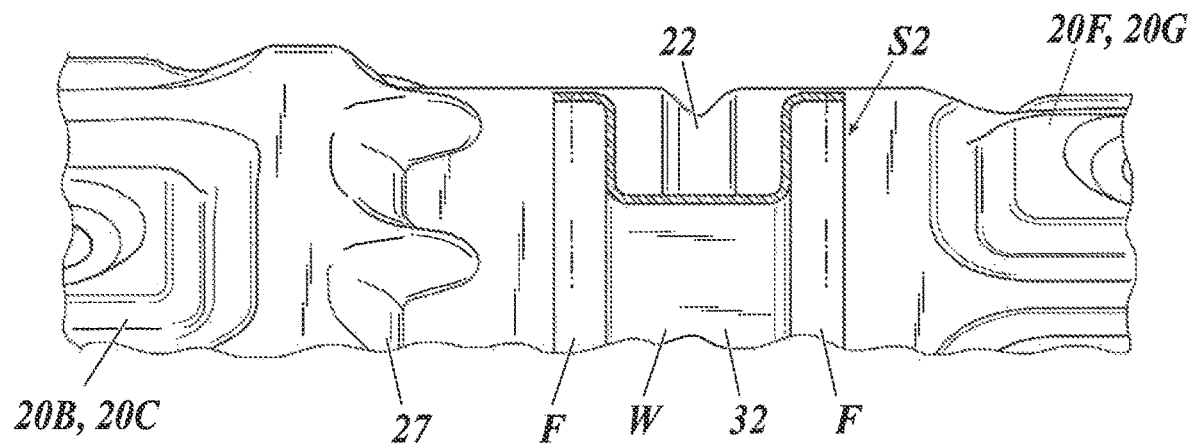
FIG. 9 is an enlarged perspective view showing a portion near a center of the seat back frame.

As shown in FIG. 5 to FIG. 7, the plurality of outer circumference beads 26 are formed from around the step 25a of the outer circumference flange 25 to the tip of the outer circumference flange 25 in the folding direction.

Each of the outer circumference beads 26 is formed so that the portion of the outer circumference flange 25 positioned to the tip than the step 25a is concave to the center of the panel material 20 from the front view (for example, U-shaped from the front view or V-shaped from the front view).

Among the frame materials 31 to 34 joined to the panel material 20, as shown in FIG. 2 and FIG. 3, the side frame material 31, the upper frame material 33, and the lower frame material 34 are positioned near the outer circumference flange 25 and along the outer circumference flange 25. That is, the side frame material 31, the upper frame material 33, and the lower frame material 34 are provided as a frame along four sides of the panel material 20 formed in a rectangle.

The middle frame material 32 is joined to the position of the panel material 20 corresponding to the position between the columns in the seat back 3. That is, the middle frame material 32 is provided to be positioned in the seat back 3 between the right side seat back 3a and the center seat back 3c or the left side seat back 3b and the center seat back 3c. Described in more detail, the middle frame material 32 is joined in the space between the right region A and the center region C of the panel material 20 and the left region B and the center region C of the panel material 20.

The frame materials 31 to 34 are joined to the panel material 20 at the surface (front surface of the panel material 20) on the folding direction side of the outer circumference flange 25. That is, the projecting direction of the frame materials 31 to 34 and the folding direction of the outer circumference flange 25 are matched. With this, the seat back frame 10 becoming larger in the front and back direction can be suppressed.

The web W of the frame materials 31 to 34 project forward than the tip of the outer circumference flange 25 in the folding direction, as shown in FIG. 5. Various necessary components such as the above-described head rest frames 11, 12, and 13 are attached to the front surface of the web portion W of the upper frame material 33 and the lower frame material 34. Therefore, if the web portion W projects forward, the necessary components such as the head rest frames 11, 12, and 13 do not interfere with the outer circumference flange 25 of the panel material 20.

As shown in FIG. 5 to FIG. 9, first to fourth beads 21 to 24 are formed in the panel material 20 in positions facing the frame materials 31 to 34. That is, two first beads 21 are formed corresponding to the left and right side frame materials 31 and 31, and two second beads 22 are formed corresponding to the left and right middle frame materials 32 and 32. One third bead 23 is formed corresponding to the upper frame material 33, and one fourth bead 24 is formed corresponding to the lower frame material 34.

Described in more detail, the beads 21 to 24 are formed along a length direction of the frame materials 31 to 34.

The first beads 21 and 21, the third bead 23, and the fourth bead 24 are formed in the above-described spaces S1, S3, and S4, respectively, along the outer circumference edge in four sides of the panel material 20. That is, the first beads 21 and 21, the third bead 23, and the fourth bead 24 are provided together with the side frame material 31, the upper frame material 33, and the lower frame material 34 near the outer circumference of the panel material 20 (outer circumference flange 25) and along the outer circumference edge (outer circumference flange 25).

The second beads 22 and 22 are formed in the above described spaces S2 and S2 in the region of the panel material 20 between the right region A and the center region C, and the left region B and the center region C respectively.

The first to fourth beads 21 to 24 project to the web portion W side (that is the front) of the frame materials 31 to 34 which are hat type frame materials.

The first to fourth beads 21 to 24 are formed along the length direction of the corresponding frame materials 31 to 34. However, the present embodiment is not limited to the above, and the first to fourth beads 21 to 24 are to be formed along a surface direction of the panel material 20. The first to fourth beads 21 to 24 may be formed short and in a plurality of numbers in the direction orthogonal to the length direction of the corresponding frame materials 31 to 34, and the shape can also be zigzag.

As shown in FIG. 3, FIG. 4, FIG. 7, and FIG. 8, the panel material 20 is formed to be concave with relation to the side frame material 31, the middle frame material 32, and the lower frame material 34 among the frame materials 31 to 34. The panel material 20 includes non-joining portions 201, 202, and 204 where the flange F of the frame materials 31, 32, and 34 are not joined.

Non-joining portions 201 are formed in a position of the space S1 near the center in the vertical direction. The space S1 is where the side frame material 31 is joined. Two non-joining portions 201 are formed with an interval vertically. That is, two non-joining portions 201 are provided in each of both the left and the right edges of the panel material 20.

Non-joining portions 202 are formed in a position of the space S2 toward the bottom than the center in the vertical direction. The space S2 is where the middle frame material 32 is joined. That is, the non-joining portion 202 is provided in each of both the left and the right sides of the center region C in the panel material 20.

Non-joining portions 204 are formed in the space S4 where the lower frame material 34 is joined. One is formed in the lower side of the right region A, one is formed in the lower side of the left region B, and two are formed in the lower side of the center region C. The two non-joining portions 204 and 204 formed in the lower side of the center region C is set to have different sizes.

The portions where the non-joining portions 201, 202, and 204 are formed is not joined to the frame materials 31, 32, and 34. Therefore, the stiffness of these portions is set to be lower than the other portions joined to the frame materials 31, 32, and 34. When goods such as luggage collide with the seat back frame 10 and the impact load is applied, the non-joining portions 201, 202, and 204 are to be the point of origin of the deforming in the panel material 20. With this, the impact when the luggage stored in the trunk collides strongly with the seat back 3 can be easily absorbed.

The first bead 21, the second bead 22, and the fourth bead 24 formed in the position opposing to the side frame material 31, the middle frame material 32, and the lower frame material 34 are formed to pass the non-joining portions 201, 202, and 204, respectively.

In other words, the non-joining portions 201, 202, and 204 are provided to sandwich from both sides the first bead 21, the second bead 22, and the fourth bead 22 formed in each of the spaces S1, S2 and S4.

Another bead 27 is formed in a shape different from the second beads 22 and 22 near the second beads 22 and 22 in the panel material 20.

The another bead 27 is provided to surround the reinforcement structure sections 20F and 20G in the center region C of the panel material 20. The another bead is formed in a wave shape to meander so as to become close and then to become far from the reinforcement structure sections 20F and 20G.

As shown in FIG. 3 and FIG. 4, a portion of the another bead (wave-shaped bead) 27 formed in such wave shape extends toward the non-joining portions 202 and 202 provided on both the left and the right side of the center region C in the panel material 20 so as to be formed as one with the non-joining portions 202 and 202.

As shown in FIG. 3 and FIG. 4, the panel material 20 includes a plurality of holes 213 and 214 formed in the position corresponding to the frame materials 31 to 34.

The plurality of holes 213 . . . are formed in the upper edge of the panel material 20 with intervals in the horizontal direction. A plurality of round holes and a plurality of long holes are included.

The plurality of holes 214 . . . are formed in the lower edge of the panel material 20 with intervals in the horizontal direction. A plurality of round holes and a plurality of long holes are included.

When a component such as the head rest frame, etc. is joined to the upper frame material 33 and the lower frame material 34, the plurality of holes 213 and 214 are formed to perform laser welding from the rear of the panel material 20. Therefore, the component such as the head rest frame, etc. is provided in the positions in which the plurality of holes 213 and 214 are formed.

The plurality of holes 213 and 214 are formed to join the necessary components such as the head rest frames 11, 12, 13, etc. to the upper frame material 33 and the lower frame material 34 by laser welding from the rear of the panel material 20.

Preferably, the plurality of long holes among the plurality of holes 213 and 214 are preferable because a large range can be used for welding by laser welding.

The third bead 23 and the fourth bead 24 are formed throughout the space between adjacent holes 213 and 213 and holes 214 and 214 among the plurality of holes 213 and 214. That is, even if the plurality of holes 213 and 214 for joining the necessary components such as the head rest frames 11, 12, 13, etc. are formed in the panel material 20, such plurality of holes 213 and 214 can be in a state as if connected by the beads 23 and 24.

Even if the plurality of holes 213 and 214 are formed, the upper frame material 33 and the lower frame material 34 are joined to the spaces S3 and S4 in which the plurality of holes 213 and 214 are formed. Therefore, the stiffness necessary for the panel material 20 is maintained.

Further, the outer circumference flange 25 is formed in the outer circumference edge of the panel material 20, and a plurality of outer circumference beads 26 . . . are formed in the outer circumference flange 25. Therefore, this contributes to maintaining the stiffness necessary for the panel material 20.

Similarly, the position in the outer circumference flange 25 of the upper edge of the panel material 20 where the striker 14 and the seatbelt attaching portion 15 are provided are non-continuous portions 25b and 25c with part of the outer circumference flange 25 itself missing. Even if there are non-continuous portions 25b and 25c in the outer circumference flange 25, the upper frame material 33 and the third bead 23 are provided along the outer circumference flange 25 in the upper edge of the panel material 20. Therefore, this contributes to maintaining the stiffness necessary in the panel material 20.

As shown in FIG. 4, the plurality of holes 213 and 214 include holes 213 and 214 formed in positions where extending lines of the beads 21 to 24 positioned in the orthogonal directions among the beads 21 to 24 intersect.

That is, the holes 213 and 214 are respectively formed in the positions where the extending lines of the first beads 21 and 21 intersect with the extending lines of the third bead 23 and the fourth bead 24, and the position where the extending lines of the second beads 22 and 22 intersect with the extending lines of the third bead 23 and the fourth bead 24. There is a projection nut which is provided in a portion where the frame materials 31 to 34 overlap or in the reinforcement panels 28 and 29 in the positions where the extending lines of the beads 21 to 24 intersect. Described in detail, the portions where the extending lines of the beads 21 to 24 intersect are portions where the members need to be welded to each other, and since the holes 213 and 214 are formed for welding, the stiffness of this portion needs to be enhanced. Therefore, the holes 213 and 214 are formed in the positions where the extending lines of the beads 21 to 24 intersect with each other.

The seat back frame 10 includes a plurality of columns as the seat back 3a, seat back 3b, and seat back 3c but the configuration is not limited to the above. For example, a seat back frame divided in a ratio of 6:4 between left and right or the seat back divided in a ratio of 5:5 can be employed. Further, the configuration of the seat back frame 10 is not limited to a rear seat and can be applied to a front seat.

According to the present embodiment, the panel material 20 can be reinforced by the frame material 30 (31 to 34) and the panel material 20 can be reinforced by the beads 21 to 24. Therefore, the stiffness of the seat back frame 10 is enhanced synergistically by both the frame materials 31 to 34 and the beads 21 to 24. Since the stiffness of the seat back frame 10 is enhanced, the noise generated when the stiffness is insufficient and the noise caused by the vibration when the vehicle is running can be suppressed.

The frame materials 31 to 34 are formed with a hat-type frame material including the flange F. Therefore, the frame materials 31 to 34 can be easily joined to the panel material 20 and the accuracy of the joining is enhanced. Therefore, the reliability of joining the frame materials 31 to 34 to the panel material 20 is enhanced.

The beads 21 to 24 project to the web portion W side of the frame materials 31 to 34 and the portion where the frame materials 31 to 34 are joined can be made smaller while enhancing the stiffness.

The beads 21 to 24 are formed along the length direction of the frame materials 31 to 34, and the stiffness of the seat back frame 10 is enhanced throughout a large range along the length direction of the frame materials 31 to 34. With this, the noise generated due to insufficient stiffness and the noise caused by the vibration of the vehicle can be suppressed even more.

The non-joining portions 201, 202, and 204 can be formed in the panel material 20 to be concave with relation to the frame materials 31, 32, and 34. Therefore, the noise which occurs due to contact between the panel material 20 and the frame materials 31, 32, and 34 can be suppressed.

The first bead 21, the second bead 22, and the fourth bead 24 are formed to pass the non-joining portions 201, 202, and 204. Therefore, the stiffness of the non-joining portions 201, 202, and 204 is enhanced.

The frame materials 31 to 34 are joined along the four sides of the panel material 20, and the beads 21 to 24 are formed along the four sides of the panel material 20. Therefore, the stiffness of the outer circumference portion of the panel material 20 is enhanced even more.

The middle frame materials 32 and 32 are joined in a position in the panel material 20 corresponding to a position between the columns in the seat back 3. The second beads 22 and are formed in a position of the panel material 20 corresponding to the position between the columns in the seat back 3. Therefore, the stiffness of the center of the panel material 20 is enhanced even more.

A plurality of outer circumference beads 26 . . . and wave-shaped beads 27 are formed near the second beads 22 and 22 in the panel material 20 with a shape different from the second beads 22 and 22. Therefore, the stiffness of the panel material 20 can be enhanced synergistically by the second beads 22 and 22, the plurality of external circumference beads 26 . . . , and the wave-shaped bead 27.

The wave-shaped bead 27 is formed near the second beads 22 and 22 which are formed in the position of the panel material 20 corresponding to the position between the columns in the seat back 3. Therefore, the stiffness of the center of the panel material 20 can be even more enhanced synergistically by both the second beads 22 and 22 and the wave-shaped bead 27.

The third beads 23 and the fourth beads 24 are formed throughout the space between the adjacent holes 213 . . . and 214 . . . among the plurality of holes 213 . . . and 214 . . . formed in the position corresponding to the upper frame material 33 and the lower frame material 34. Therefore, the stiffness necessary in the panel material 20 can be obtained even if the plurality of holes 213 . . . and 214 . . . are formed.

The plurality of holes 213 . . . and 214 . . . include the holes 213 and 214 formed in the position where the extending lines of the beads 21 to 24 positioned in the orthogonal direction among the beads 21 to 24 intersect. Therefore, the stiffness of the portion in the panel material 20 where the holes 213 and 214 are formed can be enhanced.

INDUSTRIAL APPLICABILITY

The reinforcement structure of the seat back frame according to the present invention can enhance the stiffness in the seat back frame and can suppress noise. Therefore, the industrial applicability is high.

REFERENCE SIGNS LIST 1 vehicle seat
2 seat cushion
3a right side seat back
3b left side seat back
3c center seat back
4a right side head rest
4b left side head rest
4c center head rest
10 seat back frame
11, 12, 13 head rest frame
14 striker
15 seat belt attaching unit
16 arm rest bracket
20 panel material
20A, 20B, 20C, 20D, 20E, 20F, 20G reinforcement structure section
21 first bead
22 second bead
23 third bead
24 fourth bead
25 outer circumference flange
25a step
25b, 25c non-continuous portion
26 outer circumference bead
27 wave-shaped bead
28, 29 reinforcement panel
201, 202, 204 non-joining portion
213, 214 hole
30 frame material
31 side frame material
32 middle frame material
33 upper frame material
34 lower frame material
W web portion
F flange
A right region
B left region
C center region
S1, S2, S3, S4 space

The invention claimed is:

1. A reinforcement structure for a seat back frame comprising:
 a panel material; and
 a frame material joined to the panel material,
 wherein:
 the frame material is formed as a hat-type frame material including a web portion which is formed as a substantial U shape from a cross-sectional view and which forms a closed cross-sectional shape with the panel material, and a flange which is formed as one with the web portion and which is also joined to the panel material, and
 a bead is formed in the panel material in a position opposing to the frame material, and the bead is formed to extend along a direction parallel to a longitudinal extension direction of the frame material.

2. The reinforcement structure for the seat back frame according to claim 1, wherein the bead projects toward the web portion side of the frame material.

3. The reinforcement structure for the seat back frame according to claim 1, wherein another bead in a shape different from the bead is formed in the panel material near the bead.

4. The reinforcement structure for the seat back frame according to claim 1, wherein,
 the panel material includes a plurality of holes formed in a position corresponding to the frame material, and
 the bead is formed throughout a space between adjacent holes among the plurality of holes.

5. The reinforcement structure for the seat back frame according to claim 4, wherein the plurality of holes include a hole formed in a portion where extending lines of beads positioned in an orthogonal direction among the beads intersect.

6. A reinforcement structure for a seat back frame comprising:
 a panel material; and
 a frame material joined to the panel material,
 wherein:
 the frame material is formed as a hat-type frame material including a web portion which is formed as a substantial U shape from a cross-sectional view and which forms a closed cross-sectional shape with the panel material, and a flange which is formed as one with the web portion and which is also joined to the panel material,
 a bead is formed in the panel material in a position opposing to the frame material,
 the panel material includes a non-joining portion which is formed to be concave with relation to the frame material and which is where the panel material is not joined to the flange of the frame material, and
 the bead is formed to pass the non-joining portion.

7. The reinforcement structure for the seat back frame according to claim 6, wherein the bead projects toward the web portion side of the frame material.

8. The reinforcement structure for the seat back frame according to claim 6, wherein another bead in a shape different from the bead is formed in the panel material near the bead.

9. The reinforcement structure for the seat back frame according to claim 6, wherein,
   the panel material includes a plurality of holes formed in a position corresponding to the frame material, and
   the bead is formed throughout a space between adjacent holes among the plurality of holes.

10. A reinforcement structure for a seat back frame comprising:
    a panel material; and
    a frame material joined to the panel material,
    wherein:
    the frame material is formed as a hat-type frame material including a web portion which is formed as a substantial U shape from a cross-sectional view and which forms a closed cross-sectional shape with the panel material, and a flange which is formed as one with the web portion and which is also joined to the panel material,
    a bead is formed in the panel material in a position opposing to the frame material,
    the panel material is formed in a rectangular shape from a front view,
    the frame material is joined along four sides of the panel material, and
    the bead is formed along the four sides of the panel material.

11. The reinforcement structure for the seat back frame according to claim 10, wherein,
    the seat back frame includes a plurality of columns in the seat back,
    the frame material is joined to a position of the panel material corresponding to a position between the columns in the seat back, and
    the bead is formed in the position of the panel material corresponding to the position between the columns in the seat back.

12. The reinforcement structure for the seat back frame according to claim 11, wherein,
    another bead in a shape different from the bead is formed in the panel material near the bead, and
    the another bead is formed near the bead formed in the position of the panel material corresponding to the position between the columns in the seat back.

13. The reinforcement structure for the seat back frame according to claim 10, wherein the bead projects toward the web portion side of the frame material.

14. The reinforcement structure for the seat back frame according to claim 10, wherein another bead in a shape different from the bead is formed in the panel material near the bead.

15. The reinforcement structure for the seat back frame according to claim 10, wherein,
    the panel material includes a plurality of holes formed in a position corresponding to the frame material, and
    the bead is formed throughout a space between adjacent holes among the plurality of holes.

* * * * *